US012347248B1

(12) United States Patent
Subramanian et al.

(10) Patent No.: US 12,347,248 B1
(45) Date of Patent: *Jul. 1, 2025

(54) LOAD MANAGEMENT USING RANGING

(71) Applicant: ROAMBEE Corporation, Santa Clara, CA (US)

(72) Inventors: Vidya Subramanian, Santa Clara, CA (US); Sanjay Sharma, Santa Clara, CA (US); Pankaj Patel, Santa Clara, CA (US)

(73) Assignee: ROAMBEE Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/471,283

(22) Filed: Sep. 20, 2023

Related U.S. Application Data

(63) Continuation of application No. 17/555,461, filed on Dec. 19, 2021, now Pat. No. 11,887,412, which is a continuation of application No. 16/266,018, filed on Feb. 2, 2019, now Pat. No. 11,222,486.

(51) Int. Cl.
*G06Q 10/08* (2024.01)
*G06Q 10/0833* (2023.01)
*G07C 5/00* (2006.01)
*G07C 5/08* (2006.01)

(52) U.S. Cl.
CPC .......... *G07C 5/08* (2013.01); *G06Q 10/0833* (2013.01); *G07C 5/008* (2013.01)

(58) Field of Classification Search
CPC ....... G07C 5/08; G07C 5/008; G06Q 10/0833
See application file for complete search history.

(56) References Cited

U.S. PATENT DOCUMENTS

| 6,437,702 | B1 | 8/2002 | Ragland et al. |
| 7,421,112 | B2 | 9/2008 | Calver et al. |
| 10,102,495 | B1 | 10/2018 | Zhang et al. |
| 2004/0066500 | A1 | 4/2004 | Gokturk et al. |
| 2007/0143188 | A1 | 6/2007 | Kelley et al. |
| 2009/0189788 | A1 | 7/2009 | Faus et al. |
| 2016/0239792 | A1 | 8/2016 | Burch et al. |
| 2018/0038991 | A1* | 2/2018 | Chennakeshu .......... G01V 8/12 |
| 2019/0113632 | A1 | 4/2019 | Lucrecio et al. |
| 2019/0114577 | A1 | 4/2019 | Kilburn et al. |

* cited by examiner

*Primary Examiner* — Hongmin Fan

(57) ABSTRACT

A system, including a housing having a front and a rear, a controller contained within the housing, a trigger module contained within the housing, the trigger module coupled to the controller, the trigger module receiving a trigger signal and outputting a range measurement signal, a range module contained within the housing, the ranging module coupled to the controller, the range module outputs a range data signal in response to the range measurement signal, a memory module contained within the housing, the memory module coupled to the controller, the memory module storing the range data signal, a wireless transceiver contained within the housing, the wireless transceiver coupled to the controller the wireless transceiver outputting the stored range data signal and an affixment coupled to the housing rear enabling physical connection to a shipping structure.

20 Claims, 13 Drawing Sheets

LOAD MANAGEMENT USING RANGING

CROSS-REFERENCE TO RELATED APPLICATIONS

This application is a continuation of U.S. patent application Ser. No. 17/555,461, filed on Dec. 19, 2021, which is a continuation of U.S. patent application Ser. No. 16/266,018, filed on Feb. 2, 2019, now U.S. Pat. No. 11,222,486, issued on Jan. 11, 2022, the entire disclosures of which are incorporated by reference herein.

TECHNICAL FIELD OF THE APPLICATION

This application relates to a determining the cargo fill of a movable shipping structure, more specifically, determining a cargo fill using ranging triggered by specific events to allow load management for the movable shipping structure.

BACKGROUND OF THE APPLICATION

Conventional package tracking systems provide the ability for a company to locate human and/or material assets by feedback from a human operator. This capability allows the company to increase load efficiency by insuring that movable shipping structure, such as a truck or shipping container are running in an optimum fill state. Such conventional tracking systems use feedback provided by the driver or cargo handler at various intervals. Human tracking and verbal feedback lends itself to errors which in turn lead to inefficiencies in the delivery process.

Conventional load tracking provides driver or cargo handler updates to a carrier and relies on such updates to redirect movable repositories such a truck to pick up additional items. Also, conventional systems do not take into account trigger events such as sudden decelerations to notify the carriers of possible delivery issues.

Conventional load tracking does not provide automated feedback of the available space within the shipping structure or the condition of the shipment in transit such as if the shipment is not within its shipping temperature, humidity, moisture limits, or if the shipment was moved from one transport carrier to another, or the shipment was not handled properly.

Accordingly, there is a need for systems, methods, and devices for improved techniques to track loads from an origin to a destination using a tracking device such that the load and available shipping space is automatically updated without the need for human intervention.

SUMMARY OF THE APPLICATION

A first example embodiment of the present application provide at least a system, including a housing having a front and a rear, a controller contained within the housing, a trigger module contained within the housing, the trigger module coupled to the controller, the trigger module receiving a trigger signal and outputting a range measurement signal, a range module contained within the housing, the ranging module coupled to the controller, the range module outputs range data signal in response to the range measurement signal, a memory module contained within the housing, the memory module coupled to the controller, the memory module storing the range data signal, a wireless transceiver contained within the housing, the wireless transceiver coupled to the controller the wireless transceiver outputting the stored range data signal and an affixment coupled to the housing rear enabling physical connection to a shipping structure.

A second example embodiment of the present application provide at least a method, including receiving a trigger signal, triggering a range measurement via a trigger module responsive to the trigger signal and outputting a range measurement signal, ranging by a range module a distance from a back door of a shipping structure to a nearest pallet box upon a reception of the range measurement signal and outputting a range data signal, storing the range data signal and transmitting the stored range data signal via a wireless transceiver.

A third example embodiment of the present application provide at least a non-transitory computer readable medium comprising instructions that, when read by a processor, cause the processor to perform receiving a trigger signal, triggering a range measurement via a trigger module responsive to the trigger signal and outputting a range measurement signal, ranging by a range module a distance from a back door of a shipping structure to a nearest pallet box upon a reception of the range measurement signal and outputting a range data signal, storing the range data signal, transmitting the stored range data signal via a wireless transceiver and determining a fill amount of the shipping structure based on the range data signal.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
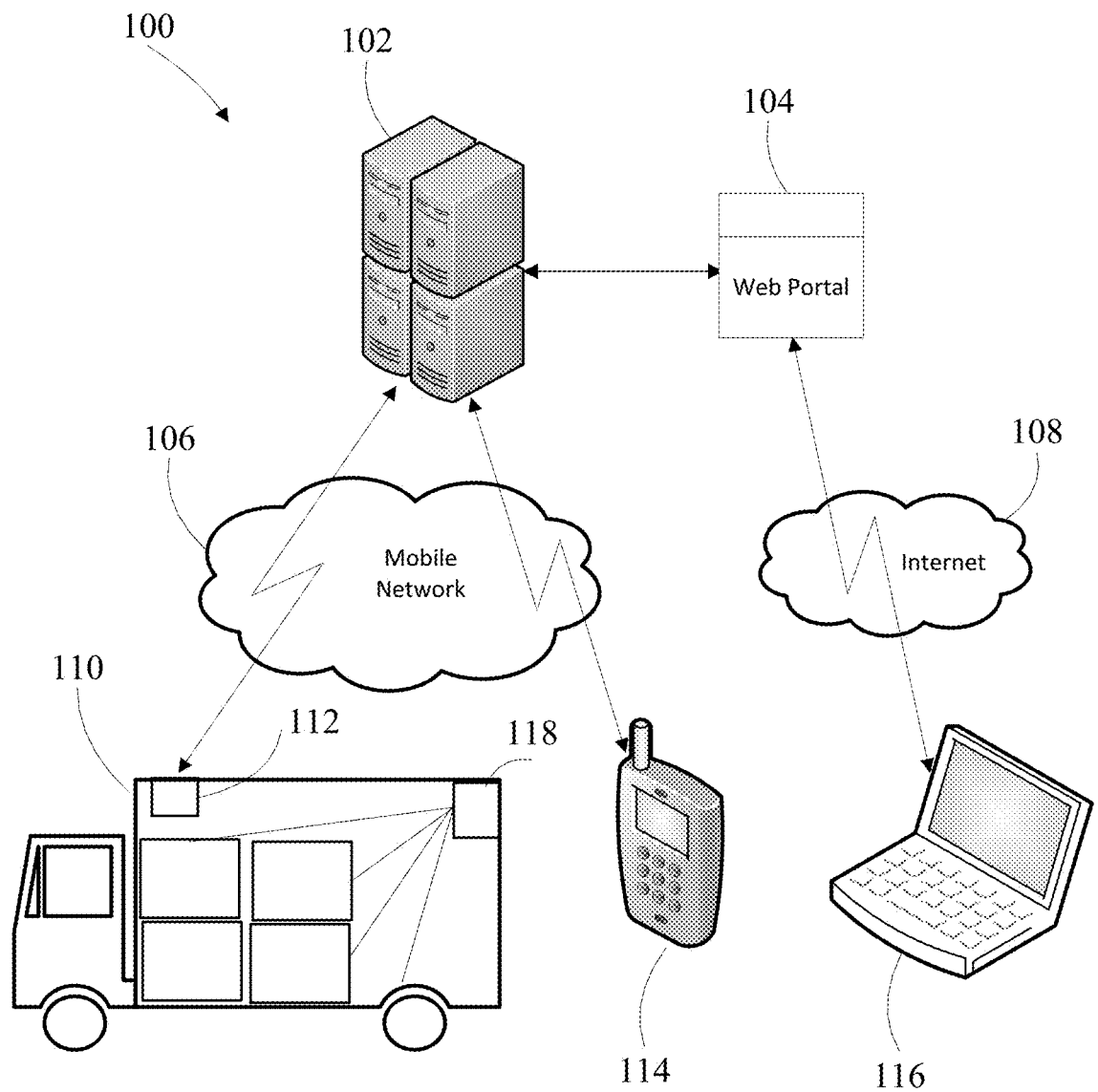
FIG. 1 is a functional block diagram of a system for tracking a load using a wireless tracker and a wireless ranging device, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE APPLICATION

The illustrative embodiments described in the detailed description, drawings, and claims are not meant to be limiting. Other embodiments may be utilized, and other changes may be made, without departing from the scope of the subject matter presented herein. It will be readily understood that the aspects of the present disclosure, as generally described herein, and illustrated in the Figures, can be arranged, substituted, combined, separated, and designed in a wide variety of difference configurations, all of which are explicitly contemplated herein. Further, in the foregoing description, numerous details are set forth to further describe and explain one or more embodiments. These details include system configurations, block module diagrams, flowcharts (including transaction diagrams), and accompanying written description. While these details are helpful to explain one or more embodiments of the disclosure, those skilled in the art will understand that these specific details are not required in order to practice the embodiments.

As will be appreciated by one skilled in the art, aspects of the present disclosure may be embodied as an apparatus that incorporates some software components. Accordingly, some embodiments of the present disclosure, or portions thereof, may combine one or more hardware components such as microprocessors, microcontrollers, or digital sequential logic, etc., such as processor with one or more software components (e.g., program code, firmware, resident software, micro-code, etc.) stored in a tangible computer-readable memory device such as a tangible computer memory device, that in combination form a specifically configured apparatus that performs the functions as described herein. These combinations that form specially-programmed devices may be generally referred to herein as "modules". The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, mobile devices and the like. A given module may even be implemented such that the described functions are performed by separate processors and/or computing hardware platforms.

Embodiments of the present disclosure include systems, methods, and devices for tracking a load using a wireless tracker and a wireless ranging device. In such embodiments, affixing a housing to a back door in a movable shipping structure, triggering a range measurement via a trigger module contained within a housing, ranging by a range module contained within the housing a distance from the back door to a nearest shipping container upon the reception of the trigger signal and outputting a range signal, transmitting the range signal via a wireless transmitter contained within the housing upon the reception of the trigger signal and determining a fill amount of a movable shipping structure based on the range signal.

The current disclosure shows a system that allows movable shipping structure such as trucks to report how much cargo is being carried. Thus allowing customers globally to determine the utilization of the carrying capacity of the shipping structure and ensure that the shipping structures are full and empty shipping structures such as trucks are not driving around.

The overall components of the system include a local server, a cloud server acting as a remote server that can accept data from mobile applications, a Bluetooth low energy (BLE) ranging device and a wireless tracker.

The mobile application may run on a smartphone in the background and listens to BLE transmissions.

In one embodiment, the system includes ranging utilizing a BLE ranging device is affixed in the back of the truck that periodically identifies the distance from the sensor where objects are within the truck. The ranging device transmits the distance to a wireless tracker affixed in the back of the truck, where the wireless tracker transmits the location of the vehicle and the distance of objects from the ranging device to the server. The server determines the size of the truck and then computes the distance of the objects from the ranging device and lets the user know how full the truck is with packages or assets. The distance determined by the ranging device determines that cargo was removed from the truck. The distance to objects is determined and the surrounding areas checked for available cargo to be moved based on space available.

The server may remotely calculate the average load a vehicle is carrying to help determine optimal movement and utilization of the vehicle. Currently load of a vehicle is determined through human means where a driver or cargo handler notes the amount of cargo in the truck manually and notifies the central dispatch of the load. This process typically does not capture the load at every stop and load of the truck with an automated solution the data can be available in real time with no human intervention.

The server may utilize the range measurements to determine that cargo has been removed from the shipping or containing structure. The range is determined and then the surrounding areas are checked for available cargo to be transferred based on available space.

The method and system of the instant disclosure allow an informed understanding of space utilization. If the amount of space in a multi package enclosure being occupied is known, a determination of how best to use the space may be more readily made. The determination of the space utilization may come from many different sensor systems such as Lidar scan, sonar scan, pictures to capture actual locations, weight sensors to determine if something is placed in a location and the like. The ability to use crowd sourced video to determine package density would make the collection and management of the data more scalable than individual sensors monitoring locations.

Solutions to continuous monitoring of a transport space may come from the sensors described or crowd sourced video. The knowledge of the storage space may allow determination of logistics may provide a deeper understanding of utilization.

FIG. 1 is a functional block diagram of a system 100 for tracking a shipment using a wireless tracker, in accordance with some embodiments. Such a system 100 includes one or more computer servers 102 that may host a web portal 104 or other user portal. A user device (114-116) such as a smartphone, tablet computer, laptop computer, and desktop computer may access the web portal 104 over the Internet 108. Alternatively, a user device 114 may access the computer server(s) 102 across a mobile network 106. In addition, a truck with a wireless tracker 112 may be on a shipping transportation vehicle 110 and is in communication with the computer server(s) 102 over the mobile network 106. Such a system may be used by a shipping delivery company or a company that frequently ships various assets among the company's facilities that are separated by geographic distances. In one embodiment a ranging device 118 determines a distance from the back door of the truck to the nearest package, the ranging trigger may be intermittent or based on sensor data, the ranging data is then sent wirelessly to a truck mounted wireless tracker 112 and may be sent based on a data download trigger sent by the truck mounted wireless tracker 112 when it is ready to accept the ranging data. The system 100 allows a shipment order to be automatically generated by the computer server(s) for a shipper based on the information received from the wireless tracker and wireless ranging module as well as a predefined list of shipment locations. A shipper may be a company or any entity that uses shipment services to deliver goods across geographical disparate shipment locations. For example, shipment locations for a shipper may correspond to manufacturing plant or research and development facilities.

In one embodiment, the wireless tracker 112 may determine its location using a global positioning system (GPS) device or communicating with one or more GPS devices over a network. Further, the wireless tracker may include a battery such that the wireless tracker 112 regulates battery usage based on the location of the wireless tracker 112. For example, when within a distance threshold of the shipment origin or shipment destination, the management module may request the communication module to determine a location of the wireless tracker 112 and ranging data at frequent intervals so as to provide frequent updates to a shipper on the location status of the shipment. However, beyond a distance threshold of the shipment origin and prior to a distance threshold of a shipment destination, frequent location status updates may not be needed by the shipper. Thus, the management module may not request the communication module to determine the location of the wireless tracker as frequently thereby regulating battery usage of the communication module. The location of the wireless tracker 112 may be forwarded to the computer server(s) 102 from the wireless tracker 112. Further, the computer server(s) may forward the location of the wireless tracker 112 to user devices (114-116).

In another embodiment, the wireless tracker 112 may include one or more sensors that are configurable. Further, the wireless tracker 112 may access the receive sensor information from the ranging device 118. In addition, the wireless tracker 112 may determine a trigger event based on the location of the wireless tracker 112 or sensor information such as deceleration or movement of the truck door. In addition, the wireless tracker 112 may send or transmit a notification to the computer server 102 based on the trigger event. Further, the computer server(s) may forward the notification to user devices (114-116). The wireless tracker 112 may send or transmit ranging data to the computer server 102. Further, the computer server(s) may forward the ranging data or other sensor data to user devices (114-116).

Figure 2:
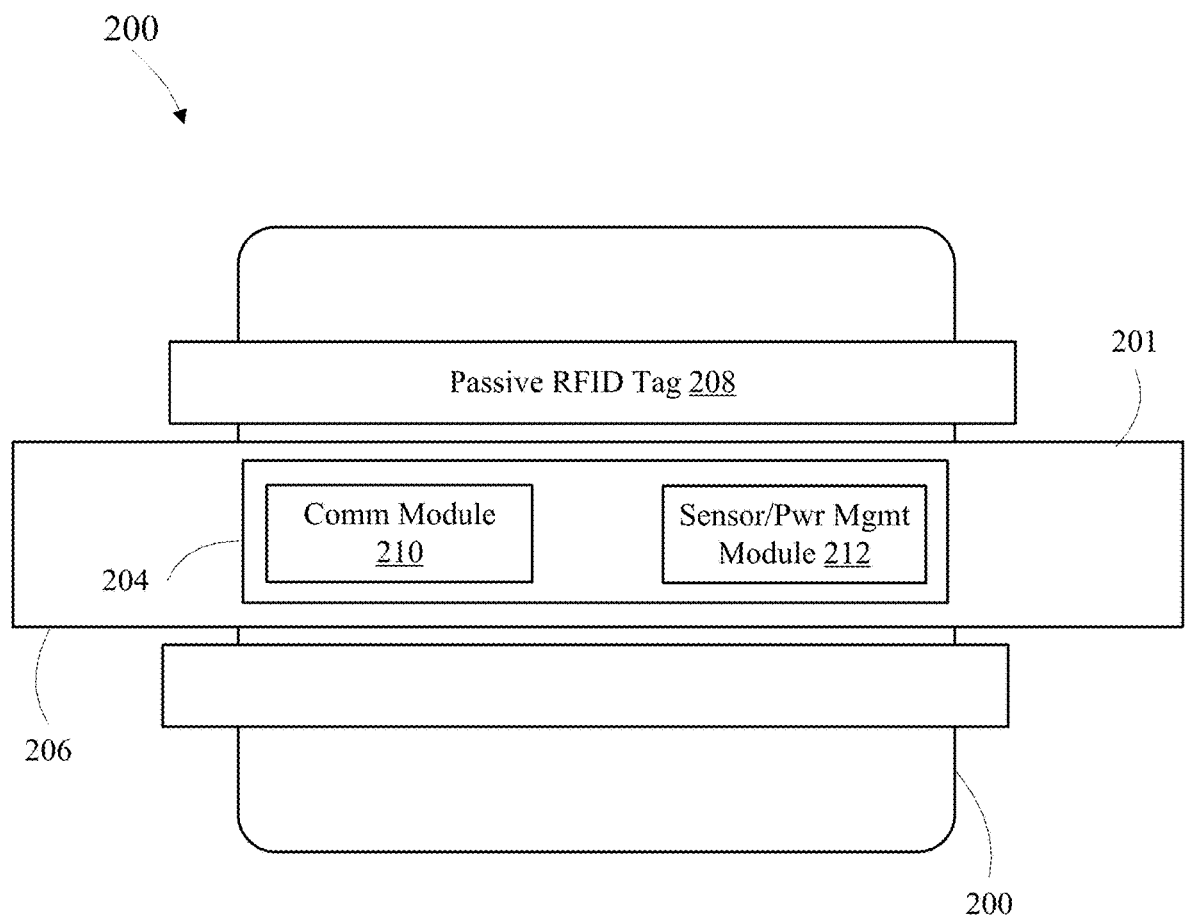
FIGS. 2-3 are functional block diagrams of a wireless tracker, in accordance with some embodiments.

In additional embodiments, the wireless 112 tracker is configured to receive and verify one or more codes to for a chain of custody of the shipment. In one embodiment, the wireless tracker receives a code at a shipment origin and receives a code at a shipment destination. Based on such authentication, the wireless tracker may transmit a notification to the computer server(s) 102 verifying chain of custody. FIG. 2 is a functional block diagram of a wireless tracker 200, in accordance with some embodiments. The wireless tracker 200 includes communication module 210 and authentication module 204 that is a bolted onto an integrated circuit board. A passive radio frequency identification (RFID) tag 208 is affixed to the truck door and programmed to have a unique identity/identification.

The wireless tracker 200 may be manufactured and operated in part by a third party manufacturer that may be used by a shipper or shipment delivery company. The third party manufacturer may own or operate one or more computer servers to communicate with the wireless tracker 200 over one or more wireless communication networks using the communication module 210. Further, the communication module 210 may be include one or communication interfaces configured to communicate over various wireless networks such as GPS, Zigbee, Zwave, WiFi, cellular/mobile, Bluetooth, WiMAX, a low power wide area network (LPWAN), a long term evolution for machines (LTE-M), category M1 (Cat M1), narrow band internet of things (NB-IoT) or any other wireless communication network. In addition, the communication module may have an interface to communicate with other devices over a wired network or a wired interface such as an Ethernet cable or USC interface. Such wired connections may be implemented when first configuring the wireless tracker 200 by the third party manufacturer prior to use.

In some embodiments, the communication module 210 is configured to determine a current location of the wireless tracker device at one or more intervals wherein the one or more intervals are based on a delivery route of the shipment. For example, the communication module 210 may be configured (by the management module 212) to determine the location of the wireless tracker frequently within a distance threshold of the shipment origin or shipment destination. However, the communication module 210 may be configured to determine the location of the wireless tracker not as frequently beyond the distance threshold of the shipment origin and prior to the distance threshold of the shipment destination. Although such a configuration manages battery life, such a configuration also avoids a situation when a user defines an alert condition when an asset enters and exits a specified geographic boundary that may not have been provided if the update interval was simply 30 minutes. In such a scenario, if the asset enters and exits the specified geographic boundary within 30 minutes then the tracing device fails t provide an update.

In an alternative embodiment, the management module 212 may receive sensor information from one or more sensors of the wireless tracker 200 at different time intervals. However, the management module may request sensor information for specific sensors only after the wireless tracker has moved to a different location thereby regulating battery life. For example, the wireless tracker 200 may include a ranging sensor. The management module 212 may be configured to only retrieve ranging sensor information when the wireless tracker has moved to a new location instead of at certain time intervals (e.g. every 30 minutes). Thus, the wireless tracker may stay at a certain location for a period of time (e.g. longer than 30 minutes) and the management module regulates battery usage/life by only gathering ranging sensor data when the wireless tracker has changed location. However, in other embodiments, the management module may request sensor information from sensors at certain time intervals associated or not associated with the location of the wireless tracker.

The wireless tracker 200 may have one or more sensors that include but are not limited to, temperature sensors, humidity sensors, location sensors, proximity sensors, accelerometers, acoustic, sound, vibration, automotive, transportation, chemical, electric current, electric potential, magnetic, radio, environment, weather, moisture, flow, fluid velocity, ionizing radiation, subatomic particles, navigation instruments, position, angle, displacement, distance, speed, acceleration, optical light, imaging, photon, pressure, force, density, level, thermal, heat, temperature, proximity, ranging and presence, etc. In one embodiment the sensor may include a location sensor. In another embodiment, the location sensor may be the communication module 210 communicating with a GPS device to retrieve location information of the wireless tracker 200. The management module 212 may be configured to configure the one or more sensors as well as receive sensor information from the one or more sensors. Further, the management module 212 may determine a trigger event based on the location of the wireless tracker device and/or sensor information. In addition, the management module 212 may transmit a notification to a computer server through the communication module based on the trigger event that is forwarded to a user device. Alternatively, sensor information may be provided to a computer server to determine a trigger event or notify the user. Moreover, a trigger event includes, but is not limited to, a shipment exiting shipment origin, delay at an intermediate location, traveling after a delay, temperature deviation, humidity deviation, route deviation, accident to delivery vehicle, tampering and shock to the delivery vehicle. Sensor may include, but are not limited to, temperature sensors, humidity sensors, location sensors, proximity sensors, accelerometers, acoustic, sound, vibration, automotive, transportation, chemical, electric current, electric potential, magnetic, radio, environment, weather, moisture, flow, fluid velocity, ionizing radiation, subatomic particles, navigation instruments, position, angle, displacement, distance, speed, acceleration, optical light, imaging, photon, pressure, force, density, level, thermal, heat, temperature, proximity, anti-tampering, ranging and presence, etc.

The authentication module 204 is used to track the chain of custody of the shipment associated with the wireless tracker 200. In one embodiment, a shipper at a shipment origin may enter an authentication code into the authentication module 204. The authentication module 204 verifies the code either locally or transfers the authentication code to a computer server for verification. Once the authentication code is verified, the shipment with the wireless tracker 200 is shipped to the destination. In one embodiment, a packing slip inside the shipment includes another authentication code. Upon receiving the shipment at the shipment destination, a receiver of the shipment may open the shipment to access the authentication code on the packing slip. The authentication code is entered into the authentication module 204 and verified (either locally or at a server). In addition, the verification may include determining whether the wireless tracker 200 is within a distance threshold of the shipment destination in accordance with the shipment order.

The authentication code may or may not be on a package slip. Further, the authentication code may include, but is not limited to, an alphanumeric code (that can be randomly generated), a text code, a graphical code (such as bar code or QR code), and biometric code (such as a fingerprint, signature, retinal scan, facial recognition, voice recognition, etc.).

In further embodiments, the management module 212 may determine that the location of the wireless tracker 200 is within a distance threshold of the shipment destination. Further, the management module 212 may determine that a code was received by the authentication module 204 within a time threshold. The distance threshold and time threshold may be parameters for the wireless tracker that are configurable by a shipper or use of the wireless tracker 200. If the code was determined to be received by the authentication module 204 within both the distance threshold and time threshold then the management module 212 may transmit a notification to a computer server through the communication module 210 verifying chain of custody. Such a notification may be sent to a user device. However, if the code was not received by the authentication module 204 either within a distance threshold or within a time threshold then the management module 212 transmit a notification to a computer server through the communication module 210 indicating a break in the chain of custody that is forwarded to a user device.

In other embodiments, the wireless tracker 200 may determine tampering such as separating the wireless tracker from the shipment. Such determination may involve processing sensor information and other parameters such as, but not limited to, ambient light, conductive tape, irregular motion detection, position, loading and orientation of the goods of the shipment.

In further embodiments, the wireless tracker 200 may implement multi-dimensional tracking such as to determine and provide the ability to configure the rules of tracking based on but not limited to if-else-while of various parameter like speed, altitude, temperature, pressure, location, range of cargo from the back door and change the behavior of tracking. For example, international tracking intervals is changed while at sea, dynamically changing the tracking geo-boundaries and conditions.

In additional embodiments, the wireless tracker 200 can associated its ID (e.g. RFID) with a shipment order information such as order number, purchase order number, Serial Shipment Container Code (SSCC), Billing of Lading number, Lorry Receipt (LR) number, Shipment Manifest number and others. Also, the wireless tracker is associated with the order information of the shipment in-transit for easy lookup. The wireless tracker may be associated with a wireless tracker identifier (e.g. RFID) such that the wireless tracker identifier is associated with shipment order information. Further, a wireless tracker 200 provides the condition of the shipment in transit such as if the shipment is not within its shipping temperature, humidity, moisture limits, load constraints or if the shipment was moved from one transport carrier to another, or the shipment was not handled properly.

The RFID tag 208 is used to uniquely identify the wireless tracker 300. Thus, when the RFID tag is read at the shipment origin, the RFID tag is stored by the computer server and associated with the shipment. The RFID tag 208 may be read again at the shipment destination to verify the RFID tag is the same as the one read at the shipment origin. The presence of RFID tag allows the wireless tracker owner to check in wireless tracker devices received after use or check out wireless tracker devices to customers for use with ease. It also provides real time inventory reconciliation and verification of device inventory at each wireless tracker device storage location.

Figure 3:
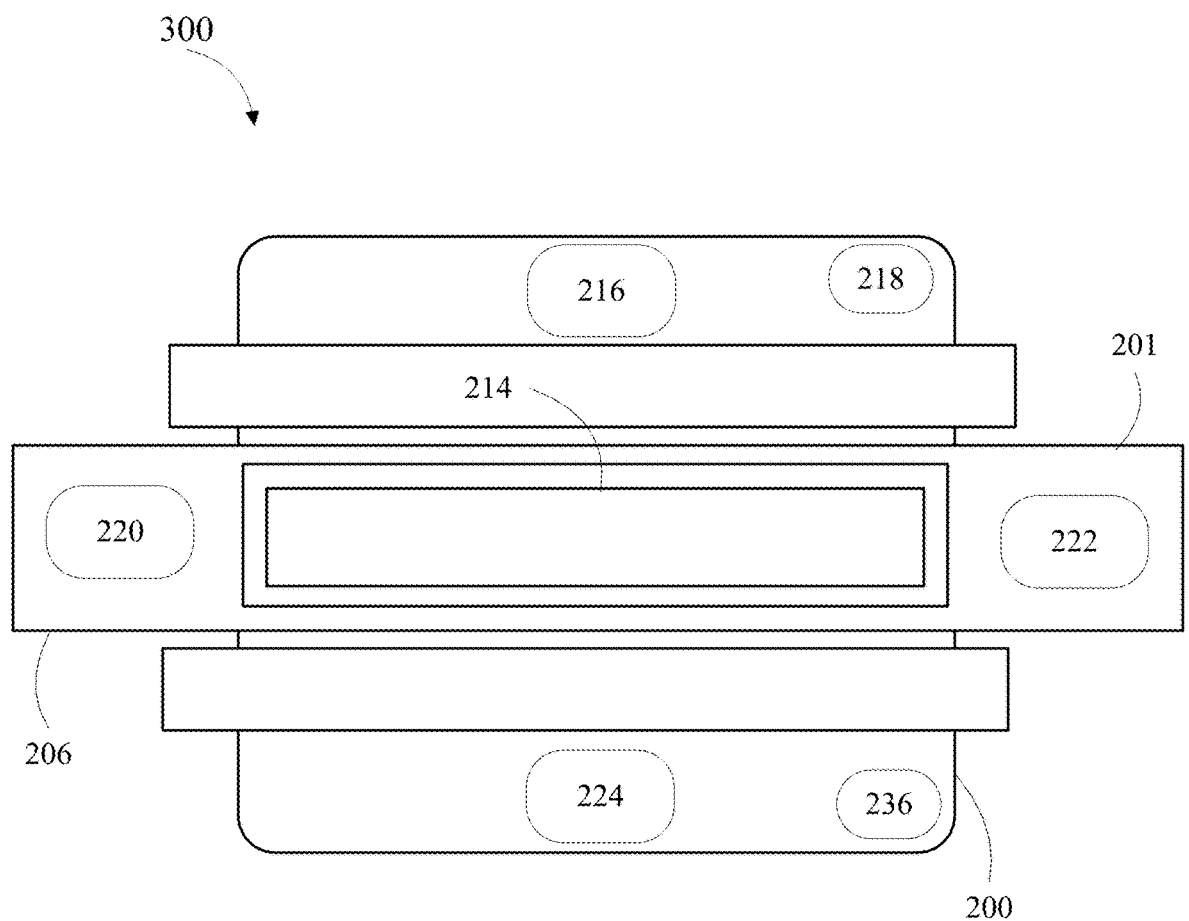

Referring to FIG. 3, a side of the wireless tracker 200 may have one or more panels (216-226) as well as a foam pad 214. The foam pad 214 may be used to cushion or otherwise reduce vibration impacting the wireless tracker 200.

Figure 4:
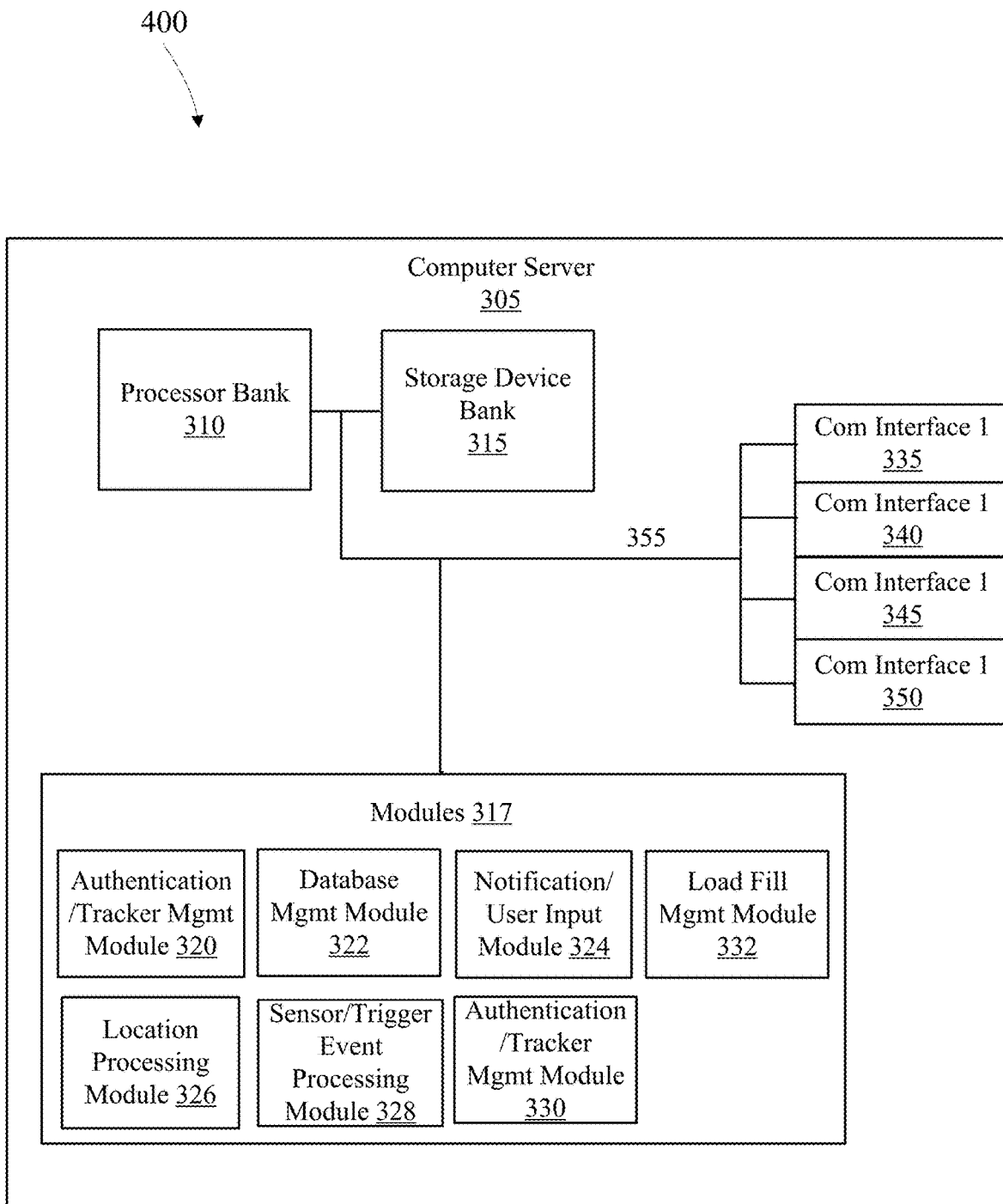
FIG. 4 depicts a functional block diagram of a server system used in tracking a load utilizing a wireless tracker and a wireless ranging device, in accordance with some embodiments.

FIG. 4 is functional block diagram of a computer server used in tracking a shipment using a wireless tracker, in accordance with some embodiments. Such a server 305 may be used in a system shown in FIG. 1. The computer server 305 may include several different components such as a processor bank 310, storage device bank 315, one or more software applications, which may be executed by a processor. Thus, the combination of the software applications as well as the processor and any other hardware form specifically-configured modules 317. The computer server 305 also has one or more communication interfaces (335-350). The processor bank 310 may include one or more processors that may be co-located with each other or may be located in different parts of the computer server 305. The storage device bank 315 may include one or more storage devices. Types of storage devices may include electronic memory, optical memory, and removable storage media. The one or more modules 317 may include, but are not limited to, authentication/tracker management module 320, database management module 322, notification/user input module 324, location processing module 326, sensor/trigger event processing module 328, and control module 330. The modules 317 may be implemented by the one or more processors in the processor bank 310. The computer server 305 and any other server described in the present disclosure may include a database stored in a storage device bank or may be coupled to a database. Further, such a computer server may be part of a computer server system described herein that may include one or more computer servers and one or more databases. In the present disclosure, a computer server may, but not always, refer to embodiments that include a computer server system having one or more computer servers and one or more databases coupled to each other. The one or more computer servers be co-located with each other or distributed among different locations. Likewise, the one or more one or more databases may be co-located with each other or distributed among different locations. In further embodiments, some of the one or more computer servers may be co-located and coupled to the one or more databases while in additional embodiments some of the one or more computer servers may be coupled to the one or more databases each of which are placed in different location. In still further embodiments, a computer server system may refer to at least one of a computer server and a database. The components shown in FIG. 3 may be located in one computer server or be distributed among more than one computer server and/or databases.

The authentication/tracker management module 320 may perform, in some embodiments, the functions of the authentication module 204 and/or the management module 212 of a wireless tracker described herein. Thus, the authentication/tracker management module 320 may be used in tracking the chain of custody of the shipment associated with a wireless tracker. In one embodiment, a shipper at a shipment origin may enter an authentication code into the authentication module of the wireless tracker. Further, the wireless tracker (via its communication module) may transmit the authentication code to computer server 305. The authentication/tracker management module 320 verifies the authentication code and may provide the wireless tracker and/or a user device with a notification that the authentication code has been verified. Once, the authentication code is verified, the shipment with the wireless tracker is shipped to a shipment destination. In one embodiment, a packing slip inside the shipment includes another authentication code. Upon receiving the shipment at the shipment destination, a receiver of the shipment may open the shipment to access the authentication code on the packing slip. The authentication code is entered into the authentication module 204 of the wireless tracker. Further, the wireless tracker (via its communication module) may transmit the authentication code to computer server 305. The authentication/tracker management module 320 verifies the authentication code received at the shipment destination. Further, a notification may be sent to the wireless tracker or the user device that the chain of custody of the shipment has been verified.

The location processing module 326 may determine the location of the shipment based on one or more current locations received from the wireless tracker. Further, the location processing module 326 may access a Global Positioning System (GPS) information (e.g. map information) as well as geo-zone information surrounding one or more shipment locations (i.e. shipment origin, shipment destination, intermediate shipment locations). The location processing module 326 may process such information to determine one or more trigger events. Such trigger events may use the location processing module 326 to communicate with the notification/user input module 324 to send a notification based on the trigger event to a user device. In addition, once a location is determined by the location processing module 326, such location and associated location information may be provided to the authentication/tracker management module for further processing or the notification/user input module 324 to send a notification to the user device. For example, the location processing module 326 may receive a location of the shipment from the wireless tracker that indicates that the shipment is at the shipment origin. Further, the location processing module 326 has access to information that there is geo-zone surrounding the shipment origin. Subsequently, the location processing module 326 may receive a location of the shipment from the wireless tracker that indicates that the shipment has exited the geo-zone surrounding the shipment origin. The location processing module 326 determines that such an event is a trigger event and thereby communicates with the notification/user input module 324 to send a notification to the user device that the shipment has left the shipment origin. These trigger events may also be utilized to signal the ranging unit to take measurements inside the truck to determine the load at specific geo-locations.

In further embodiments, the authentication/tracker management module 320 may receive the location of the wireless tracker from the location processing module 326 and may determine that the location of the wireless tracker is within a distance threshold of the shipment destination. Further, the authentication/tracker management module 320 may determine that a code was received by the authentication/tracker management module 320 within a time threshold. The distance threshold and time threshold may be parameters that are configurable by a shipper or user of the wireless tracker. If the code was determined to be received and verified by the authentication/tracker management module 320 within both the distance threshold and time threshold then the authentication/tracker management 320 may transmit a notification (via the notification/user input module 324) to the user device verifying chain of custody. However, if the code was not received by the authentication/tracker management module 320 either within a distance threshold or within a time threshold then the authentication/tracker management module 320 transmit a notification (via the notification/user input module 324) to the user device indicating a break in the chain of custody.

In some embodiments, the authentication/tracker management module 320 is configured to determine a current location of the wireless tracker device at one or more intervals wherein the one or more intervals are based on a delivery route of the shipment. For example, the authentication/tracker management module 320 may configure the wireless tracker to determine its location frequently within a distance threshold of the shipment origin or shipment destination. However, the authentication/tracker management module 320 may configure the wireless tracker to determine its location infrequently beyond the distance threshold of the shipment origin and prior to the distance threshold of the shipment destination. Although such a configuration manages battery life of the wireless tracker, such a configuration also avoids a situation when a user defines an alert condition when an asset associated with the wireless tracker enters and exits a specified geographic boundary that may not have been provided if the update interval was simply 30 minutes. In such a scenario, if the asset enters and exits the specified geographic boundary within 30 minutes then the tracing device fails to provide an update.

In other embodiments, the wireless tracker provides an update regarding remaining battery life of the wireless tracker to the computer server 305. Further, the remaining battery life may be forwarded to a user device by the notification/user input module 324. The authentication/tracker management module 320 may determine to adjust (automatically or based on user input in response to the notification of remaining battery life) the frequency of location and sensor updates of the wireless tracker to better manage the remaining battery life and provides such configuration information to the wireless tracker, accordingly. Further based on a route of the wireless tracker (the route may be preprogrammed into the computer server 305 or determined by the computer server 305 based on one or more location updates provided by the wireless tracker), may provide configuration information to regulate the battery life of the wireless tracker. In additional embodiments, the computer server 305 may receive and process one or more location n updates from the wireless tracker to determine a route deviation of the wireless tracker. The computer server provide additional may configuration information to further regulate the battery life based on the route deviation.

In further embodiments, the computer server 305 may receive the current location of the wireless tracker and the location processing module 326 determines that the current location of the wireless tracker is a shipment destination.

In additional embodiments, the computer server 305 may determine tampering of the wireless tracker such as separating the wireless tracker from the shipment. Such determination may involve processing sensor information and other parameters such as, but not limited to, ambient light, conductive tape, irregular motion detection, and orientation of the goods of the shipment.

In further embodiments, the computer server 305 may implement multi-dimensional tracking of the wireless tracker such as to determine and provide the ability to configure the rules of tracking based on but not limited to if-else-while of various parameter like speed, altitude, temperature, pressure, location and change the behavior of tracking. For example, international tracking intervals is changed while at sea, dynamically changing the tracking geo-boundaries and conditions.

In additional embodiments, the wireless tracker can associated its ID (e.g. RFID) with a shipment order information such as order number, purchase order number, Serial Shipment Container Code (SSCC), Billing of Lading number, Lorry Receipt (LR) number, Shipment Manifest number and others, and provides such information to the computer server for further processing and notification to the user. Also, the wireless tracker is associated with the order information of the shipment in-transit for easy lookup. Further, a wireless tracker provides to the computer server 305 the condition of the shipment in transit such as if the shipment is not within its shipping temperature, humidity, moisture limits, or if the shipment was moved from one transport carrier to another, or the shipment was not handled properly such that the computer server notifies or takes action on such information.

The database management module 322 manages the storage and access of information related to the operation of the wireless tracker or shipment information. For example, the database management module 322 may store one or more locations of the shipment that is provided by a wireless tracker. In addition, the database management module 322 may store information from one or more sensors coupled to and provided by the wireless tracker. Such location information and sensor information may be used to determine a trigger event to notify the shipper.

The notification/user input module 324 may perform several different functions. One such function may be to receive user input from a user device. Such user input may be configuration parameters for operating the wireless tracker. These may include specified times or locations to query the wireless tracker for sensor information, location, or other status information. Another function of the notification/user input module 424 to provide a notification based on a trigger event to the user device. A notification may be generated based on a trigger event determined by the different modules of the computer server 305 such as, but not limited to, the authentication/tracker management module 320, location processing module 326, and the sensor/trigger event processing module 328.

The sensor/trigger event processing module 328 may receive sensor information from the wireless tracker. Further, the sensor/trigger event processing module may determine certain trigger events based on the received sensor information and send a notification (via the notification/user input module 324) to a user device. In addition, the sensor/trigger event processing module may be programmed or receive configuration parameters to be forwarded to the wireless tracker for its operation. For example, the configuration parameters may include time and location of providing location and other sensor information as well as at which time periods to operate the different sensors to regulate battery life.

In some embodiments, the computer server 305 may receive a notification from the wireless tracker. Further, the computer server 305 may process the information in the notification based on configuration parameters and transmit information to the wireless tracker to take some further action. For example, a user may be tracking a shipment traveling from Las Vegas to Washington, D.C. (by air transport) with an intermediate stop in Dallas during the winter season. However, the computer server 305 may receive a notification that the shipment was diverted to have an intermediate stop at Chicago instead of Dallas due to severe weather conditions surrounding the Dallas area. The computer server 305 may have configuration information that includes that the shipment may be temperature sensitive and cannot be in environment less than 32 degrees Fahrenheit. Further, the computer server may have additional configuration information that if the shipment is at a location above a certain latitude or in a certain geographical area, to request the wireless tracker take a temperature reading with its temperature sensor and provide such temperature sensor information to the computer server 305. Further, if the computer server 305 is notified that the temperature is less than 32 degrees Fahrenheit, then the computer server may send a notification to shipper personnel to place the shipment in a warmer environment.

The control module 330 includes software hardware functions assist in performing certain tasks for the computer server 305 such as providing access to a communication link (e.g. wired, wireless, Bluetooth, infra-red, RF, etc.), executing an operating system, managing software drivers for peripheral components, and processing information. In addition, the control module 330 may also include software drivers for peripheral components, user interface computer programs, debugging and troubleshooting software tools. Also, the control module 330 may include an operating system. Such operating systems are known in the art for computer server 305 but may also include computer operating systems (e.g. Windows, Linux, UNIX, and MacOS, etc.).

The ranging module 332 includes software and hardware functions that assist in performing certain tasks for the computer server 305 such as storing a configuration of the wireless tracker and its associated ranging device, storing destination locations, shipment locations, evolving truck inventories and the associated ranging data. The computer server 305 additionally determines the truck fill percentage based on the ranging data. The computer server 305 additionally transmits notifications pertaining to wireless sensor data and ranging data from the ranging device to user devices. The notifications may be initiated by trigger events sensed by the sensors.

Each of the communication interfaces (335-350) may be software or hardware associated in communicating to other devices. The communication interfaces (335-350) may be of different types that include a user interface, USB, Ethernet, WiFi, WiMax, wireless, optical, cellular, or any other communication interface coupled to a communication network. One or more of the communication interfaces (335-350) may be coupled to a user interface known in the art.

An intra-device communication link 355 between the processor bank 310, storage device bank 315, modules 317, and communication interfaces (335-350) may be one of several types that include a bus or other communication mechanism.

Figure 5:
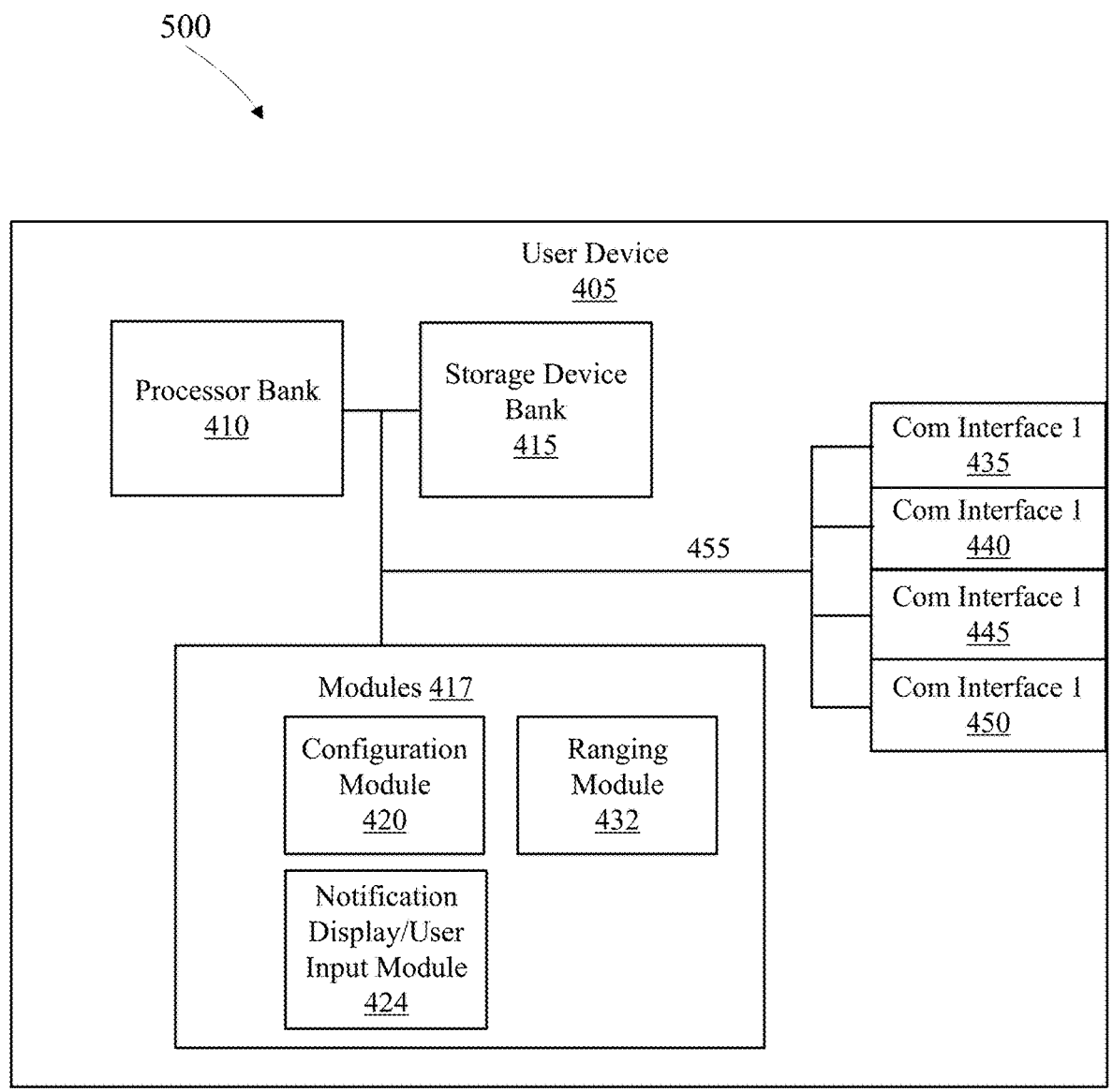
FIG. 5 depicts a functional block diagram a device used in tracking a load utilizing a wireless tracker and a wireless ranging device, in accordance with some embodiments.

FIG. 5 is functional block diagram of a user computing device 405 for providing configuration information to a wireless tracker as well as receiving trigger event notifications based on wireless tracker information, in accordance with some embodiments. Such a user device 405 may be used in a system shown in FIG. 1. The user device 405 may include several different components such as a processor bank 410, storage device bank 415, one or more software applications, which may be executed by a processor. Thus, the combination of the software applications as well as the processor and any other hardware form specifically-configured modules 417. The user device 405 also has one or more communication interfaces (435-450). The processor bank 410 may include one or more processors that may be co-located with each other or may be located in different parts of the shipper computing device 405. The storage device bank 415 may include one or more storage devices. Types of storage devices may include electronic memory, optical memory, and removable storage media. The one or more modules 417 may include, but are not limited to, a configuration module 420 and a notification display/user input module 424. The modules 417 may be implemented by the one or more processors in the processor bank 410. Examples of user devices, include, but are not limited to, desktop computers, laptop computers, tablet computers, smartphones, and any other computing devices.

A user may provide configuration information for a wireless tracker. Such user input may be entered into a user interface (one or of the communication interfaces (435-450)) and may be received by the notification display/user input module 424. Such configuration information may include time and location of providing location and other sensor information of the wireless tracker as well as at which time periods to operate the different sensors of the wireless tracker to regulate its battery life. The configuration module 420 may process such configuration information and determine whether such user input may conflict with current operation of the wireless tracker or with a prior configuration of the wireless tracker. If so, the configuration module may provide a notification on the notification display 424. If not, the configuration information may then be transmitted to one or more computer servers over one of the communication interfaces (435-450). Also, the notification display/user input module 424 may receive a notification from the computer server(s) via the communication interface (435-450) and display such a notification on a user interface.

In some embodiments, the user device 405 may receive a notification from the wireless tracker (via a computer server) and present the notification to a user on a user device display. Further, the user may enter information into a user device user interface that may be transmitted to the wireless tracker (via the computer server) to take some further action. For example, a user may be tracking a shipment traveling from Las Vegas to Washington, D.C. (by air transport) with an intermediate stop in Dallas during the winter season. However, the user device 405 may receive a notification that the shipment was diverted to have an intermediate stop at Chicago instead of Dallas due to severe weather conditions surrounding the Dallas area. The shipment may be temperature sensitive and cannot be in environment less than 32 degrees Fahrenheit. The user may input information that is transmitted to the wireless tracker (via the computer server) to request the wireless tracker take a temperature reading with its temperature sensor and provide such temperature sensor information to the user device (via the computer server). Further, if the user is notified that the temperature is less than 32 degrees Fahrenheit, then the user may enter information to the computer server to notify shipper personnel to place the shipment in a warmer environment.

Each of the communication interfaces (435-450) may be software or hardware associated in communicating to other devices. The communication interfaces (435-450) may be of different types that include a user interface, USB, Ethernet, WiFi, WiMax, wireless, optical, cellular, or any other communication interface coupled to a communication network. One or more of the communication interfaces (435-450) may be coupled to a user interface known in the art.

The ranging module 432 includes software and hardware functions that assist in performing certain tasks for the mobile device such as triggering a ranging measurement, receiving the ranging measurement signal and outputting a range data signal, storing the range data signal and transmitting the range data signal from the wireless tracker upon request or at predetermined intervals.

An intra-device communication link 455 between the processor bank 410, storage device bank 415, modules 417, and communication interfaces (435-450) may be one of several types that include a bus or other communication mechanism.

Figure 6:
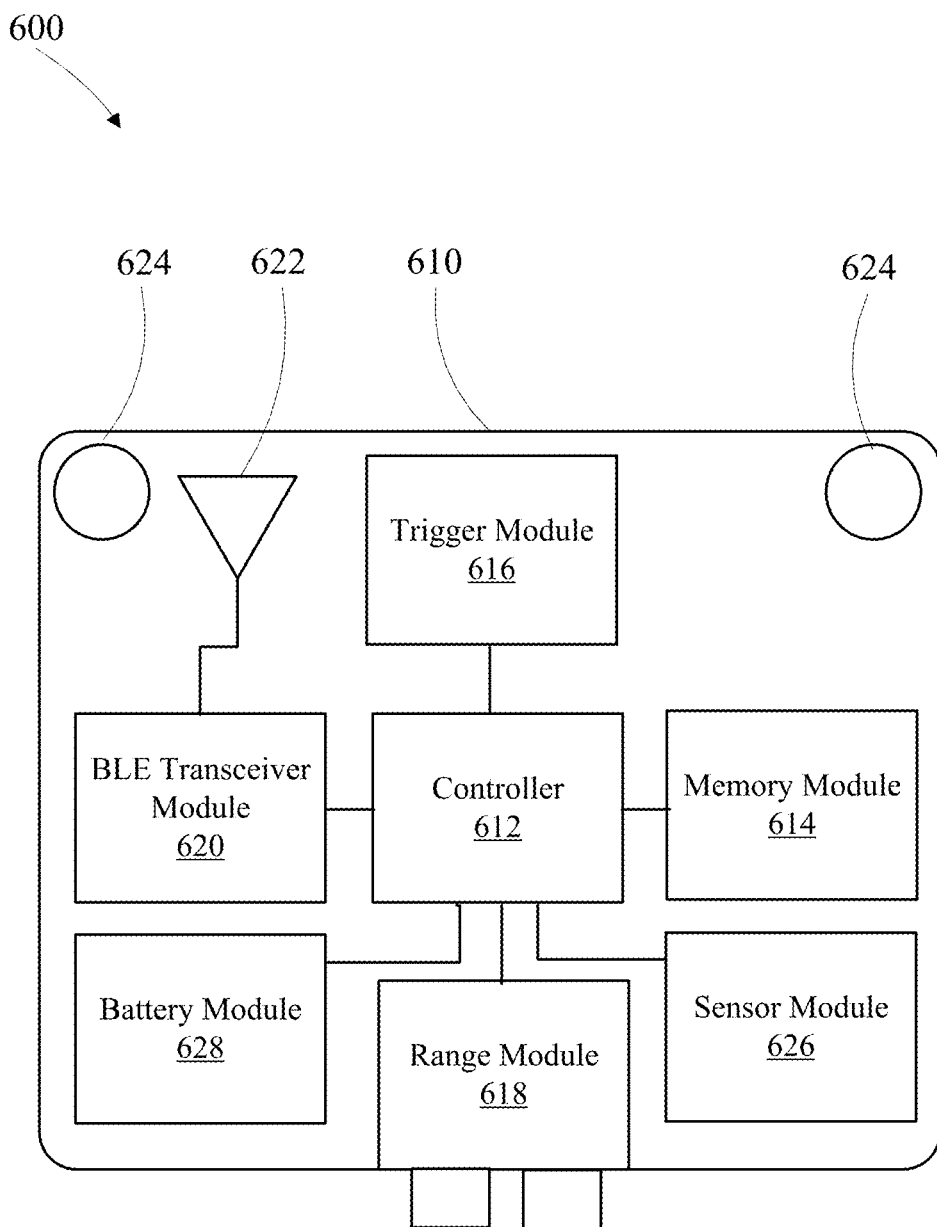
FIG. 6 is a functional block diagram of a ranging device, in accordance with some embodiments.

FIG. 6 depicts an example ranging unit 600. The ranging unit is contained within a housing 610 that houses a local controller 612, a memory 614, a trigger module 616, a range module 618, a transceiver in this example a Bluetooth low energy (BLE) transceiver, an antenna 622, magnets 624, a sensor module 626 and a battery 628.

In this example, the controller acts as the central hub of the device, receiving trigger signals from the trigger module, wireless signals from the BLE transceiver module 620, ranging signals from the range module 618 and sensor signals from the sensor module 626. The controller additionally sends the ranging signals to memory 614 and sends the range data to the BLE transceiver module for transmission from the antenna 622 to a wireless tracker. The transceiver module 620 may also communicate by Zigbee, Zwave, WiFi, cellular/mobile, Bluetooth, WiMAX, a low power wide area network (LPWAN), a long term evolution for machines (LTE-M), category M1 (Cat M1), narrow band internet of things (NB-IoT) or any other wireless communication network.

The memory 614 in this example will store ranging data for subsequent transmission and may be volatile or static memory.

The trigger module 616 triggers the range module 618 to take ranging data. The trigger module may include an accelerometer or gyroscope to measure movement of the truck door, or starting and stopping. The trigger may also activate based on GPS data received from the wireless tracker via the BLE transceiver module 620 or may trigger based on time. The wireless tracker may also communicate over Zigbee, Zwave, WiFi, cellular/mobile, Bluetooth, WiMAX, a low power wide area network (LPWAN), a long term evolution for machines (LTE-M), category M1 (Cat M1), narrow band internet of things (NB-IoT) or any other wireless communication network.

The range module 618 may be a sound navigation and ranging device (SONAR) or a light detection and ranging (LIDAR) device. Sonar devices may output a 1D or 2D output whereas a Lidar may output a 3D measurement of the internal contents of the truck. In either case the distance from the ranging module to the packages are measured.

The BLE transceiver module 620 and antenna 622 send data to and receive commands from the wireless tracker.

The housing 610 may be affixed to the truck door by means of magnets 624, hook and loop fasteners, or the like.

The sensor module 626 may contain sensors that pertain to the environment within the truck that include but are not limited to, temperature sensors, humidity sensors, location sensors, proximity sensors, accelerometers, acoustic, sound, vibration, automotive, transportation, chemical, electric current, electric potential, magnetic, radio, environment, weather, moisture, flow, fluid velocity, ionizing radiation, subatomic particles, navigation instruments, position, angle, displacement, distance, speed, acceleration, optical light, imaging, photon, pressure, force, density, level, thermal, heat, temperature, proximity, and presence, etc. In one embodiment the sensor may include a location sensor.

The ranging device may include a battery such that the controller 612 regulates battery usage based on the location supplied by the wireless tracker 112. For example, when within a distance threshold of the shipment origin or shipment destination, the management module of the wireless tracker may request the communication module to determine a location of the wireless tracker 112 and ranging data at frequent intervals so as to provide frequent updates to a shipper on the location and fill status of the shipment. However, beyond a distance threshold of the shipment origin and prior to a distance threshold of a shipment destination, frequent location status updates may not be needed by the shipper. In another embodiment the ranging device may take ranging data when directed to by the wireless tracker 112. This directing may occur at various time intervals, determined locations or due to door movement and the like.

Figure 7:
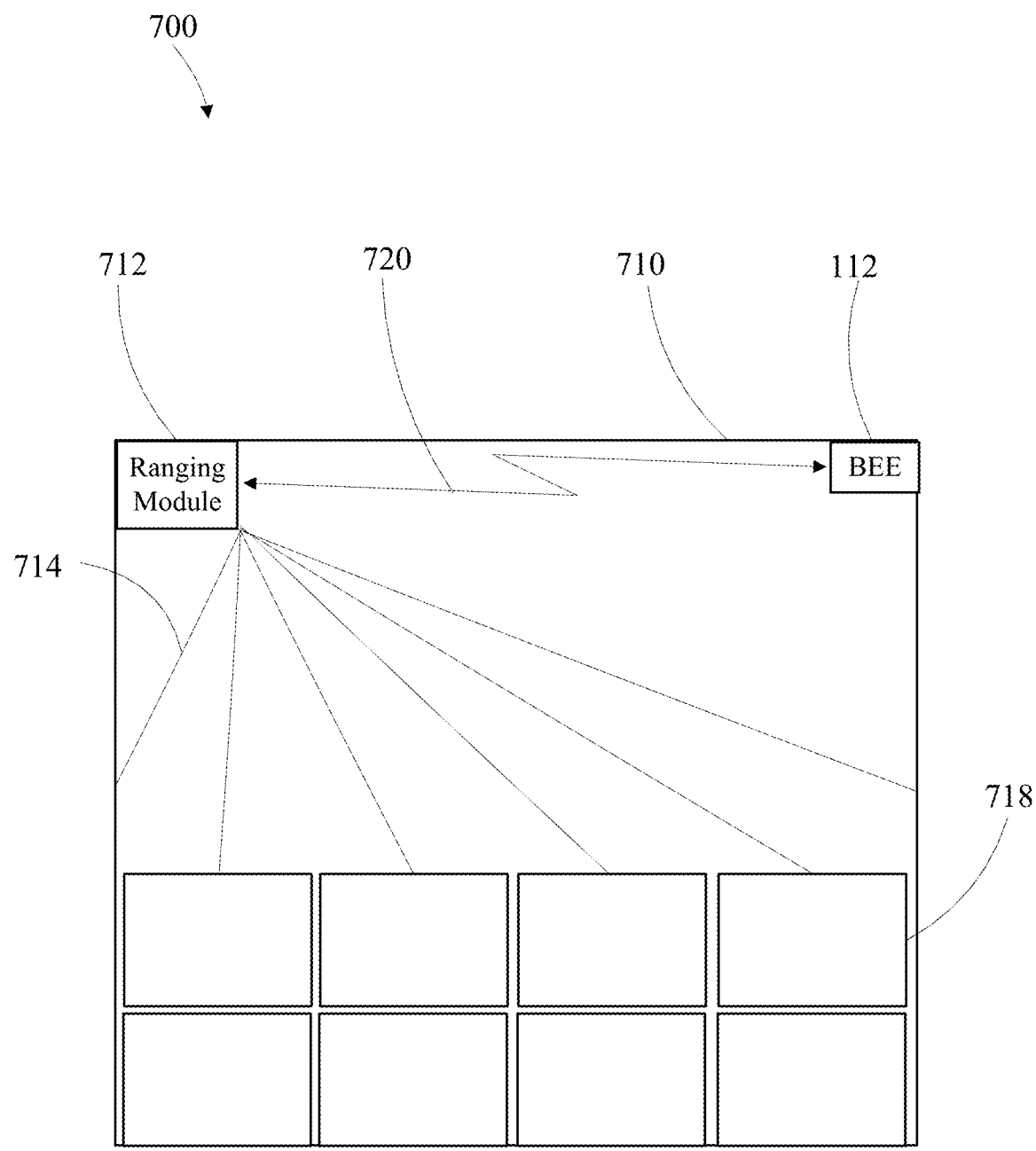
FIG. 7 is a diagram of light detection and ranging (LIDAR) ranging a load using a wireless ranging device, in accordance with some embodiments.

FIG. 7 depicts a light detection and ranging device (LIDAR) ranging device 712 at the door end of a movable shipping structure such as a truck 710 or in alternate embodiments a shipping container or non-movable shipping structures such as an enclosed room containing packages and the like. The ranging device 712 communicates data 720 on shipping ranges 714 of the packages 718 to the wireless tracker 112. The trigger event for the ranging to take place may be an accelerometer or gyro in the device detecting movement of the door, location data received from the wireless tracker 112, and internal clock or a request for data from the wireless tracker 112.

Figure 8:
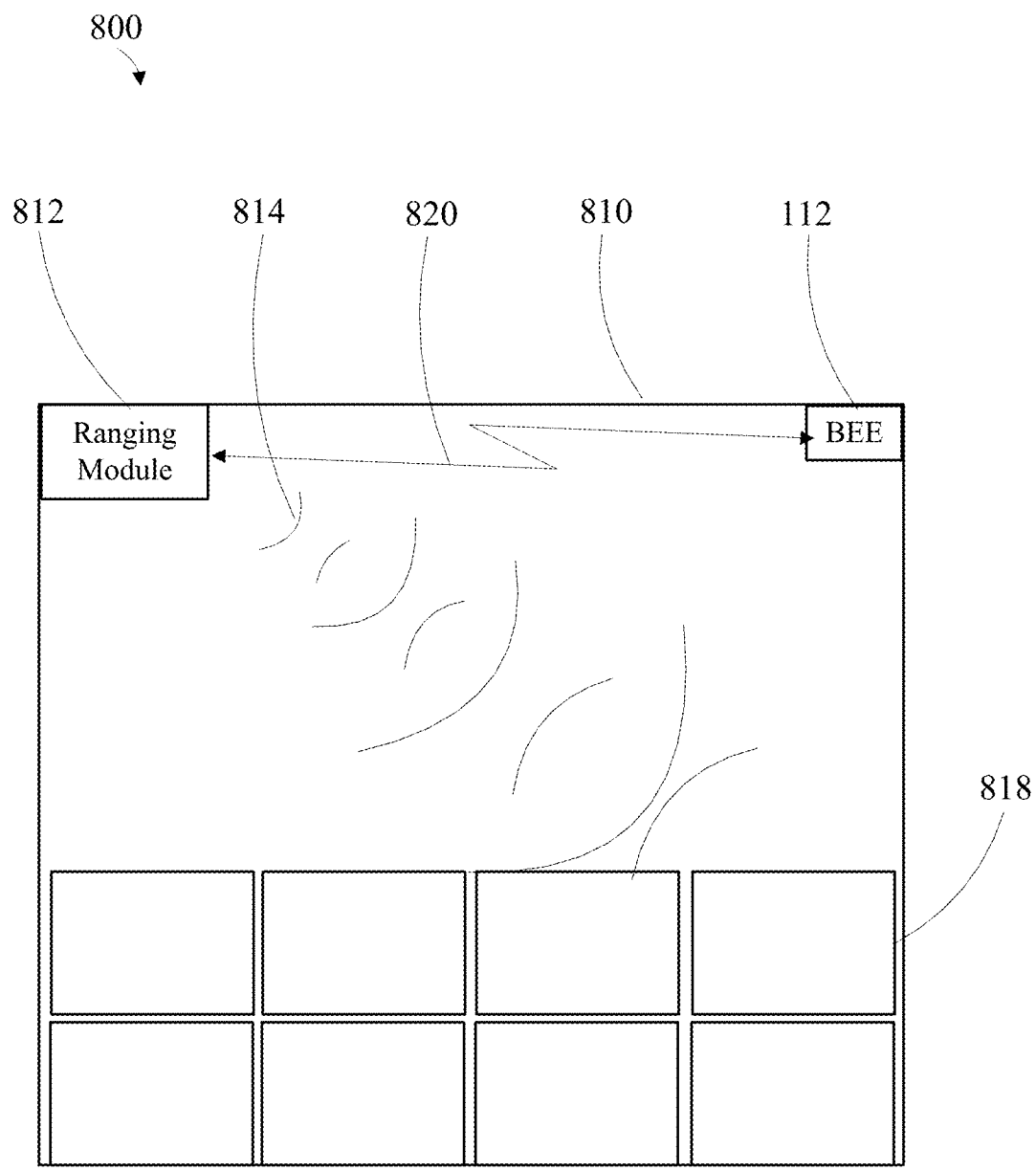
FIG. 8 is a diagram of sound navigation and ranging device (SONAR) ranging a load using a wireless ranging device, in accordance with some embodiments.

FIG. 8 depicts a sound navigation and ranging device (SONAR) ranging device 812 at the door end of a movable shipping structure such as a truck 810 or alternately a shipping container and the like. The ranging device 812 communicates data 820 on shipping ranges 814 of the packages 818 to the wireless tracker 112. The trigger event for the ranging to take place may be an accelerometer or gyro in the device detecting movement of the door, location data received from the wireless tracker 112, and internal clock or a request for data from the wireless tracker 112.

Figure 9:
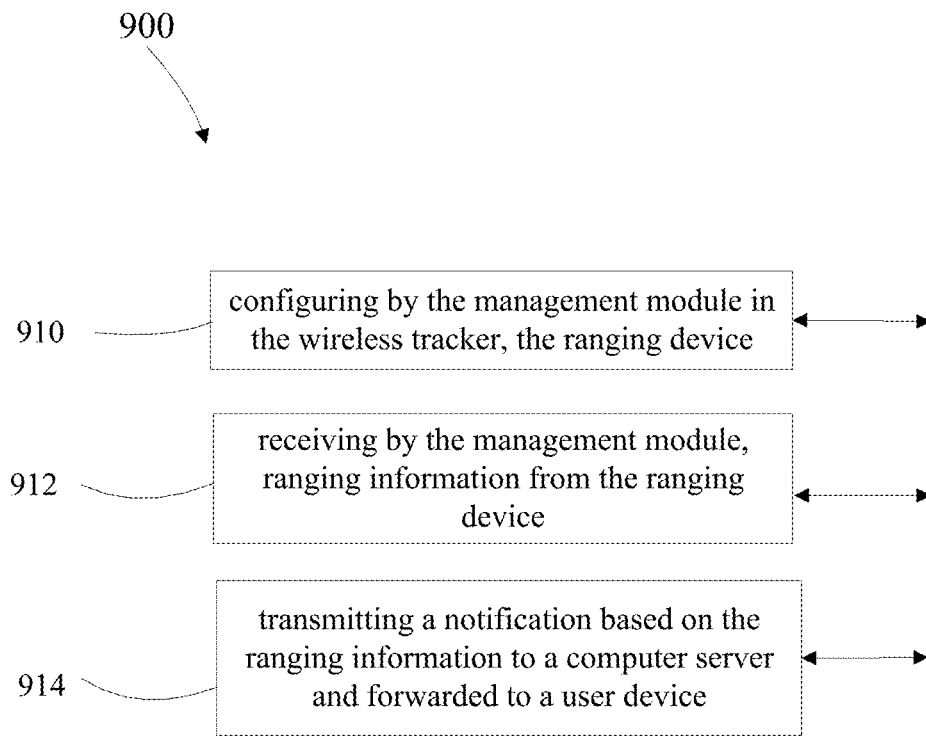
FIG. 9 is a flowchart that illustrates an example method of initial setup of a wireless ranging device, in accordance with some embodiments.

Referring to FIG. 9, an example method 900 includes configuring 910, by the management module in the wireless tracker, the ranging device. Further, the method includes receiving 912, by the management module, ranging information from the ranging device. In addition, the method includes transmitting 914 a notification based on the ranging information to a computer server and forwarded to a user device.

Figure 10:
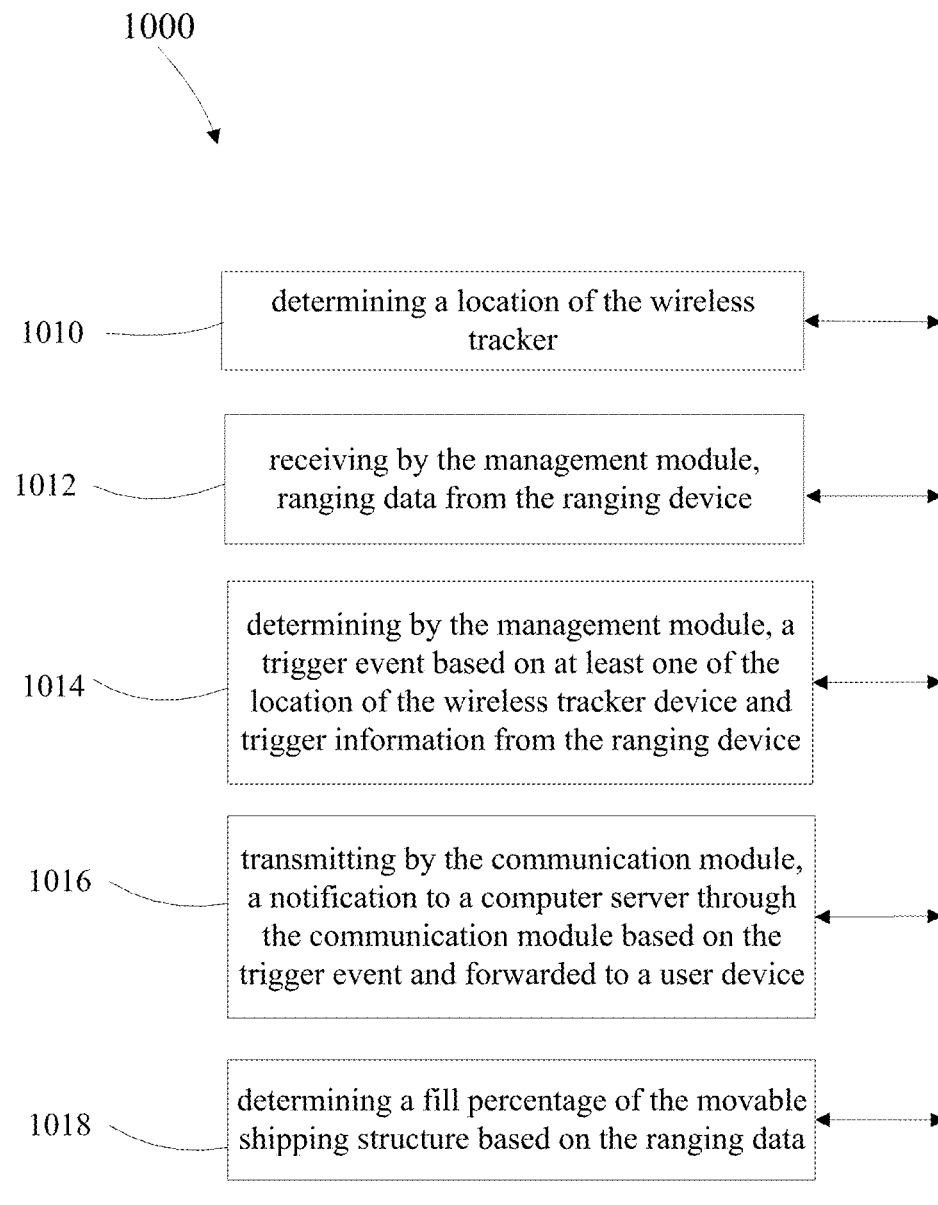
FIG. 10 is a flowchart that illustrates an example method of tracking a load using a wireless tracker and a wireless ranging device, in accordance with some embodiments.

Referring to FIG. 10, an example method 1000 includes determining 1010 a location of the wireless tracker and receiving 1012 by the management module, ranging data from the ranging device. In addition, the method includes determining 1014, by the management module, a trigger event based on at least one of the location of the wireless tracker device and trigger information from the ranging device. Moreover, the method includes transmitting 1016, by the communication module, a notification to a computer server through the communication module based on the trigger event and forwarded to a user device, the computer server determining 1018 a fill percentage of the truck based on the ranging data.

Figure 11:
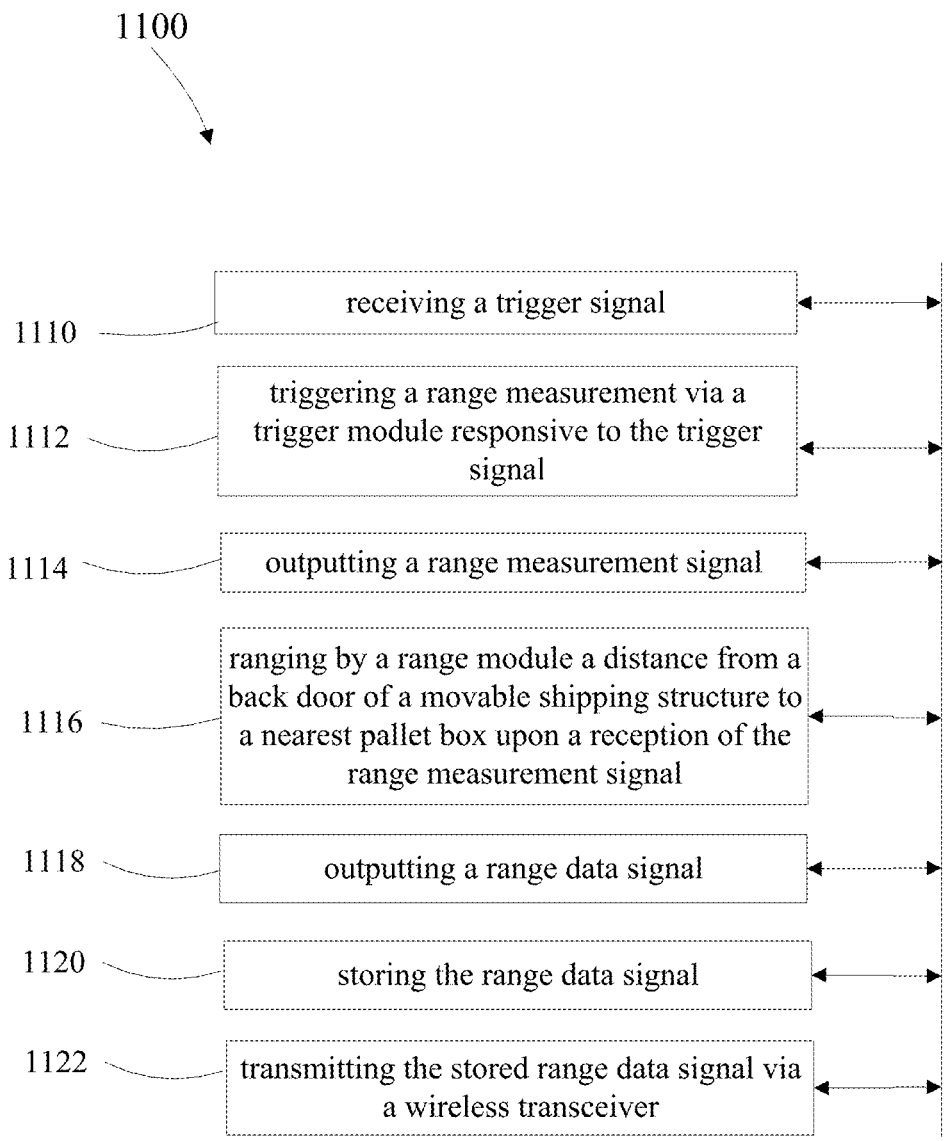
FIG. 11 is a flowchart that illustrates an example method of tracking a load using a wireless tracker and a wireless ranging device, in accordance with some embodiments.

Referring to FIG. 11, an example method 1100 includes receiving 1110 a trigger signal, triggering 1112 a range measurement via a trigger module responsive to the trigger signal and outputting 1114 a range measurement signal, the range measurement signal will transit to a ranging module via the controller. The method then provides for ranging 1116 by the range module a distance from a back door of a movable shipping structure to a nearest pallet box upon a reception of the range measurement signal and outputting 1118 a range data signal. The method also provides for storing 1120 the range data signal in a memory module and transmitting 1122 the stored range data signal via a wireless transceiver to a wireless tracker for communication to the cloud.

Figure 12:
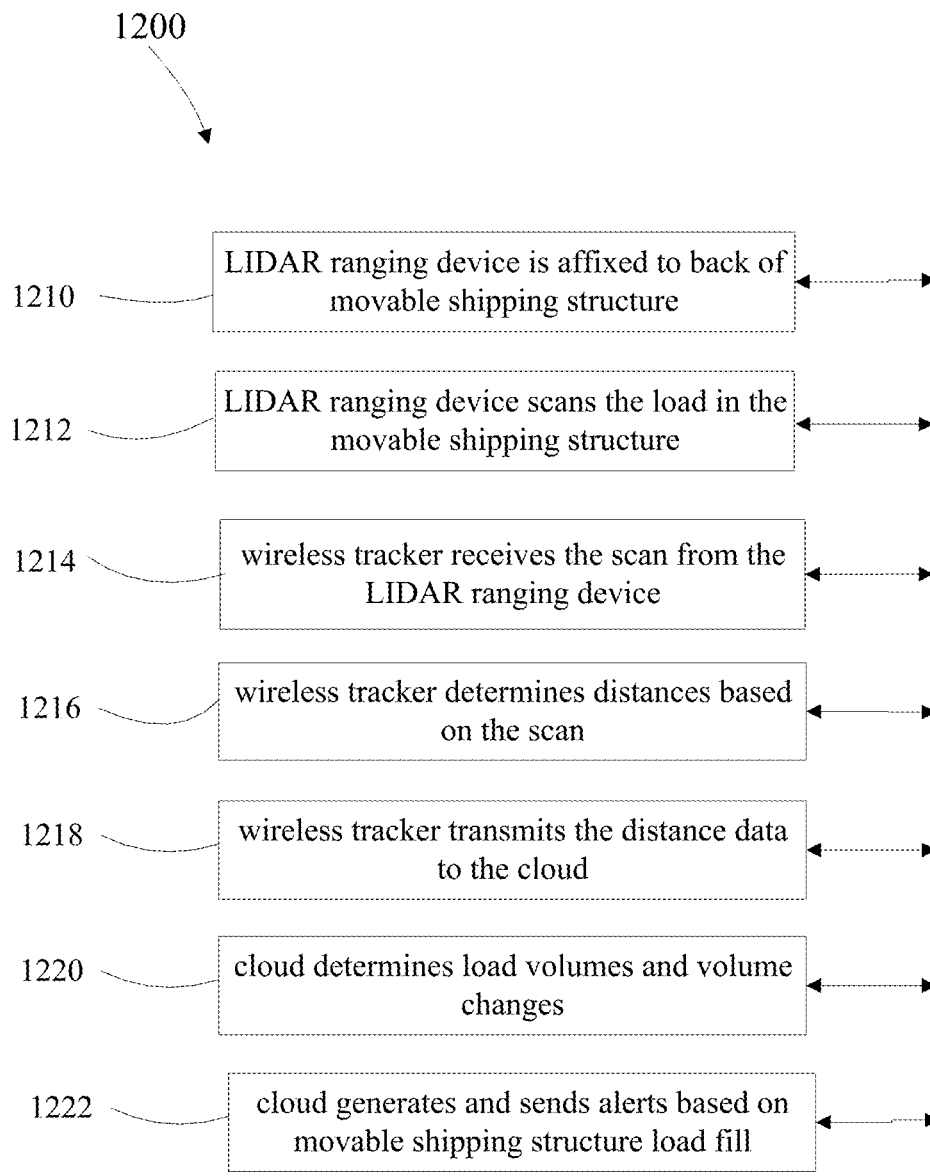
FIG. 12 is a flowchart that illustrates an example method of tracking a load using a wireless tracker and a wireless light detection and ranging (LIDAR) device, in accordance with some embodiments.

FIG. 12 depicts a LIDAR ranging device that is affixed 1210 to back of a truck, where the LIDAR ranging device scans 1212 the load in the truck and a wireless tracker receives 1214 the scan from the LIDAR ranging device. In this example method the wireless tracker determines 1216 distances based on the scan, and transmits 1218 the distance data to the cloud, where the cloud determines 1220 load volumes and volume changes and generates and sends 1222 alerts based on truck load fill.

Figure 13:
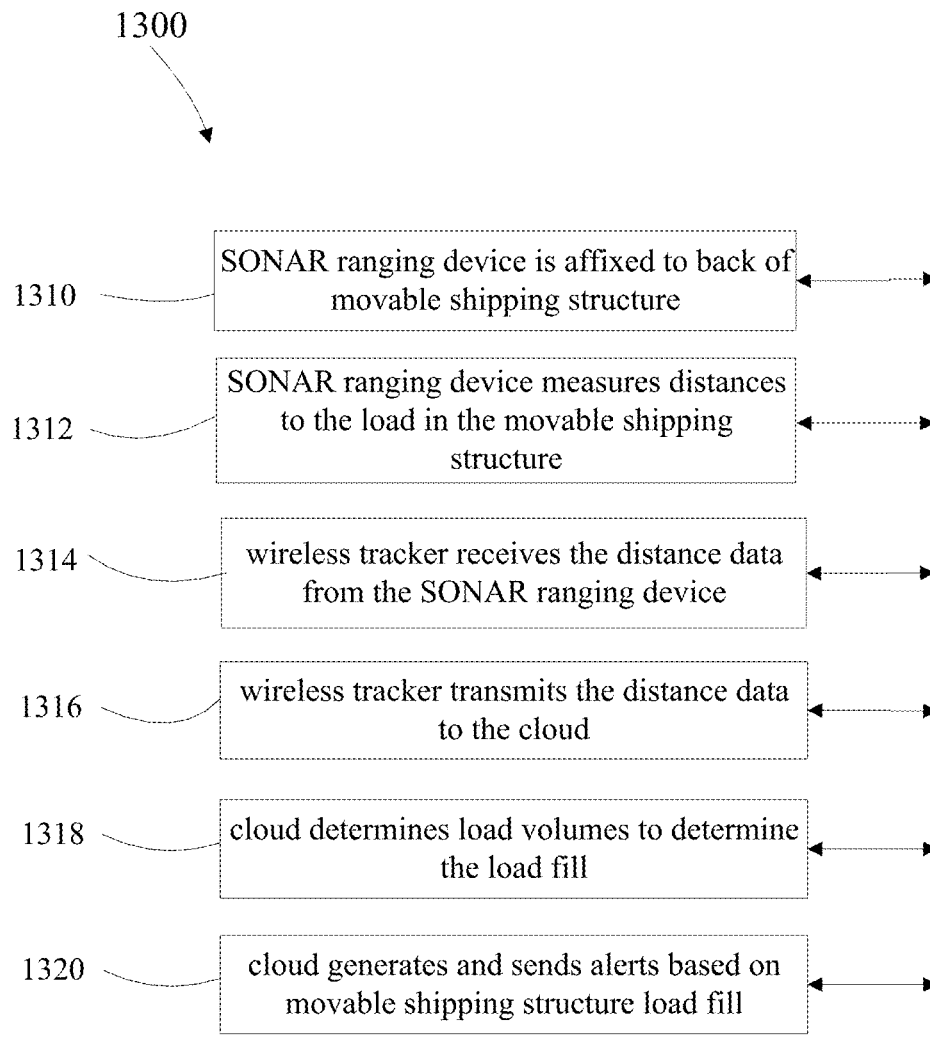
FIG. 13 is a flowchart that illustrates an example method of tracking a load using a wireless tracker and a wireless sound navigation and ranging device (SONAR) device, in accordance with some embodiments.

FIG. 13 depicts a SONAR ranging device that is affixed 1310 to back of a truck, where the SONAR ranging device measures 1312 distances to the load in the truck and a wireless tracker receives 1314 the distance data from the SONAR ranging device. In this example method the wireless tracker transmits 1316 the distance data to the cloud, which determines 1318 load volumes to determine the load fill and generates and sends 1320 alerts based on truck load fill.

Persons of ordinary skill in the art understand that the steps of methods described herein can be implemented in any order and not limited to the order discussed in the present disclosure. Further, functions implemented by modules within the computer server(s) described herein may also be implemented in the modules of the wireless tracker. In addition, functions implemented by the module of the wireless tracker may also be implemented by the computer server(s). Moreover, functions implemented by modules within the computer server(s) described herein may also be implemented in the modules of the user device. Also, functions implemented by modules within the user device described herein may also be implemented in the modules of the computer server(s).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship r order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Additionally, the terms user device and mobile device called out within this document refer to a mobile device which the user utilizes.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various s features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
ranging, by a range module, a distance from a door of a structure to a nearest location
upon a reception of a range measurement signal and outputting a range data signal, wherein the range measurement signal is retrieved in response to a ranging unit having moved to a new location; and
transmitting the range data signal via a wireless transceiver.

2. The method of claim 1, further comprising determining a fill percentage of the structure, wherein the determining is performed by at least one of a local controller and a remote server.

3. The method of claim 1, wherein the ranging is based on at least one of a sound navigation and the range module and a light detection and the range module.

4. The method of claim 1, further comprising receiving a data transmit signal, received via the wireless transceiver.

5. The method of claim 1, wherein the transmitted range data signal is at least one of a Bluetooth low energy (BLE) signal and a low power wide area network (LPWAN) signal, a long term evolution for machines (LTE-M), a category M1 (Cat M1) signal and a narrow band internet of things (NB-IoT) signal.

6. The method of claim 1, further comprising triggering the range measurement signal to be obtained via the range module responsive to a trigger signal.

7. The method of claim 6, wherein the triggering is based upon one of an acceleration, a GPS signal and a location signal.

8. A non-transitory computer readable medium comprising instructions that, when read by a processor, cause the processor to perform:

ranging, by a range module, a distance from a door of a structure to a nearest location
upon a reception of a range measurement signal and outputting a range data signal, wherein the range measurement signal is retrieved in response to a ranging unit having moved to a new location; and
transmitting the range data signal via a wireless transceiver.

9. The non-transitory computer readable medium of claim 8, further comprising determining a fill percentage of the structure, wherein the determining is performed by at least one of a local controller and a remote server.

10. The non-transitory computer readable medium of claim 8, wherein the ranging is based on at least one of a sound navigation and the range module and a light detection and the range module.

11. The non-transitory computer readable medium of claim 8, further comprising receiving a data transmit signal, received via the wireless transceiver.

12. The non-transitory computer readable medium of claim 8 further comprising triggering the range measurement signal to be obtained via the range module responsive to a trigger signal, wherein the triggering is based upon one of an acceleration, a GPS signal and a location signal.

13. The non-transitory computer readable medium of claim 8 wherein the transmitted range data signal is at least one of a Bluetooth low energy (BLE) signal and a low power wide area network (LPWAN) signal, a long term evolution for machines (LTE-M), a category M1 (Cat M1) signal and a narrow band internet of things (NB-IoT) signal.

14. A system, comprising:
a processor and memory, wherein the processor is configured to perform:
range, by a range module, a distance from a door of a structure to a nearest location
upon a reception of a range measurement signal and output a range data signal, wherein the range measurement signal is retrieved in response to a ranging unit that has moved to a new location; and
transmit the range data signal via a wireless transceiver.

15. The system of claim 14, further comprising determine a fill percentage of the structure, wherein the determination is performed by at least one of a local controller and a remote server.

16. The system of claim 14, wherein the range is based on at least one of a sound navigation and the range module and a light detection and the range module.

17. The system of claim 14, further comprising receive a data transmit signal, received via the wireless transceiver.

18. The system of claim 14, wherein the transmitted range data signal is at least one of a Bluetooth low energy (BLE) signal and a low power wide area network (LPWAN) signal, a long term evolution for machines (LTE-M), a category M1 (Cat M1) signal and a narrow band internet of things (NB-IoT) signal.

19. The system of claim 14, further comprising trigger the range measurement signal to be obtained via the range module responsive to a trigger signal.

20. The system of claim 15, wherein the trigger is based upon one of an acceleration, a GPS signal and a location signal.

* * * * *